US011204427B2

(12) United States Patent
Zhang et al.

(10) Patent No.: US 11,204,427 B2
(45) Date of Patent: Dec. 21, 2021

(54) SATELLITE SIGNAL RECEIVING DEVICE, SECURITY SENSOR, AND SECURITY CHIP

(71) Applicant: ALLYSTAR TECHNOLOGY (SHENZHEN) CO., LTD., Shenzhen (CN)

(72) Inventors: Sijing Zhang, Beijing (CN); Yong Wu, Beijing (CN)

(73) Assignee: ALLYSTAR TECHNOLOGY (SHENZHEN) CO., LTD., Shenzhen (CN)

( * ) Notice: Subject to any disclaimer, the term of this patent is extended or adjusted under 35 U.S.C. 154(b) by 188 days.

(21) Appl. No.: 16/396,754

(22) Filed: Apr. 28, 2019

(65) Prior Publication Data

US 2019/0250282 A1 Aug. 15, 2019

Related U.S. Application Data

(63) Continuation-in-part of application No. PCT/CN2017/082004, filed on Apr. 26, 2017.

(51) Int. Cl.
*G01S 19/35* (2010.01)
*G01S 19/16* (2010.01)
(Continued)

(52) U.S. Cl.
CPC ............. *G01S 19/35* (2013.01); *G01S 19/13* (2013.01); *G01S 19/16* (2013.01); *G01S 19/42* (2013.01); *G01S 19/20* (2013.01)

(58) Field of Classification Search
None
See application file for complete search history.

(56) References Cited

U.S. PATENT DOCUMENTS 5,541,845 A * 7/1996 Klein ................... G01C 21/343
340/988
5,748,147 A * 5/1998 Bickley ................ G01S 19/18
342/457

(Continued)

FOREIGN PATENT DOCUMENTS

| CN | 101153910 A | 4/2008 |
|---|---|---|
| CN | 103259646 A | 8/2013 |

(Continued)

OTHER PUBLICATIONS

Translation of CN105527630 (Year: 2016).*
(Continued)

*Primary Examiner* — Gregory C. Issing
(74) *Attorney, Agent, or Firm* — Kilpatrick Townsend & Stockton, LLP

(57) ABSTRACT

A satellite signal receiving device includes a signal analyzing device and a processor; the signal analyzing device processes a received satellite signal to obtain first information, ands send the first information to the processor; the processor receives a security command and the first information and determines an information processing type for the received first information based on the security command; determines information to process in the first information when it is determined that the information processing type of the first information is the first processing type; sends the information to process and the security command to a security algorithm device, and obtains second information returned after the security algorithm device processed the first information based on the security command; and transmits the second information. Accordingly, when the first information requires security processing, the processor transmits the information after performing a security processing, thereby improving the security of the information.

14 Claims, 4 Drawing Sheets

(51) Int. Cl.
*G01S 19/42* (2010.01)
*G01S 19/13* (2010.01)
*G01S 19/20* (2010.01)

(56) References Cited

U.S. PATENT DOCUMENTS

| | | | | |
|---|---|---|---|---|
| 5,751,245 A * | 5/1998 | Janky | ............... | G08G 1/202 |
| | | | | 342/357.4 |
| 5,838,277 A * | 11/1998 | Loomis | ............... | G01S 19/14 |
| | | | | 342/357.52 |
| 6,125,446 A * | 9/2000 | Olarig | ............... | G06F 21/57 |
| | | | | 709/223 |
| 6,457,129 B2 * | 9/2002 | O'Mahony | ............... | G06F 21/88 |
| | | | | 726/14 |
| 8,893,295 B2 * | 11/2014 | Saxena | ............... | H04W 12/08 |
| | | | | 726/27 |
| 9,013,333 B2 * | 4/2015 | Morgan | ............... | G08G 1/207 |
| | | | | 340/990 |
| 2004/0106415 A1 * | 6/2004 | Maeda | ............... | H04L 67/18 |
| | | | | 455/456.1 |
| 2008/0080712 A1 * | 4/2008 | Huang | ............... | G01S 5/0027 |
| | | | | 380/258 |

FOREIGN PATENT DOCUMENTS

| | | |
|---|---|---|
| CN | 104104511 A | 10/2014 |
| CN | 105527630 A | 4/2016 |

OTHER PUBLICATIONS

International Search Report dated Jan. 16, 2018 in the corresponding international application (application No. PCT/CN2017/082004).

* cited by examiner

SATELLITE SIGNAL RECEIVING DEVICE, SECURITY SENSOR, AND SECURITY CHIP

RELATED APPLICATIONS

The present application is a continuation-in-part application of International Application No. PCT/CN2017/082004 filed Apr. 26, 2017, entitled "SATELLITE NAVIGATION CHIP INTEGRATED WITH DATA SECURITY FUNCTION AND APPLICATION METHOD THEREFOR", which is incorporated herein by reference in its entirety.

FIELD

The disclosure relates to the field of information security, in particular to a satellite signal receiving device, a security sensor, and a security chip.

BACKGROUND

With the construction of global satellite navigation and positioning system, various kinds of related applications appeared, one of which is satellite positioning. Satellite positioning can be implemented by the security chip, and the security chip can capture/track satellite signals and provide accurate user position information, which is the basis of 3D positioning information application. However, in transmission, such positioning information is in great peril in terms of security, for example, the information security is particularly important when the positioning information is intended for some specific uses, such as police equipment, safety monitoring system for children and elderly people, as well as information security etc.

SUMMARY

Accordingly, it is necessary to provide a satellite signal receiving device, a security sensor, and a security chip in view of the foregoing problems in the prior art.

A satellite signal receiving device includes a signal analyzing device and a processor; the signal analyzing device is configured to process a received satellite signal to obtain first information, and send the first information to the processor; the processor is configured to receive a security command and the first information and determine an information processing type for the received first information based on the security command; determine information to process in the first information when it is determined that the information processing type of the first information is the first processing type; send the information to process and the security command to a security algorithm device, and obtain second information returned after the security algorithm device processed the first information based on the security command; and transmit the second information.

A security sensor includes a detecting device, an alarm device, and the foregoing satellite signal receiving device; the satellite signal receiving device is configured to send information to detect to the detecting device; the detecting device is configured to receive the information to detect, detect the information to detect according to a preset range, obtain a detection result, and send the detection result to the alarm device; and the alarm device is configured to generate an operation state control signal according to the detection result, the operation state control signal is configured to control an operation state of a security chip in which the security sensor is located.

A security chip, includes a central processing device, and the foregoing security sensor; a first operation state control signal outputted by the alarm device of the security sensor is configured to control the central processing device to be in the operating state; a second operation state control signal outputted by the alarm device of the security sensor is configured to control the central processing device to be in a non-operating state.

DETAILED DESCRIPTION OF THE EMBODIMENTS

The present disclosure will be described in details in combination with the accompanying drawings and embodiments of the present disclosure which will be more apparent. It should be understood that the particular embodiments are described for the purpose of illustrating rather than restricting the present disclosure.

Figure 1:
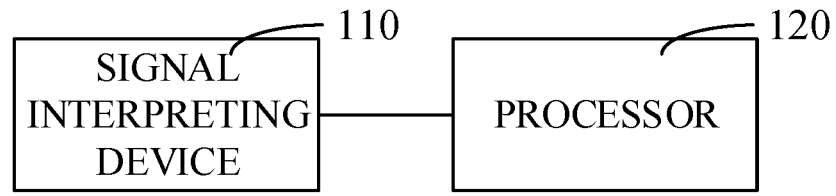
FIG. 1 is a block diagram of a satellite signal receiving device according to an embodiment.

The present disclosure provides a satellite signal receiving device, as shown in FIG. 1, which includes a signal analyzing device 110 and a processor 120.

The signal analyzing device 110 is configured to process a received satellite signal to obtain first information, and send the first information to the processor.

The signal analyzing device receives the satellite signal, performs partial processing on the satellite signal, and sends the first information in the satellite signal to the processor for processing. In an embodiment, the signal analyzing device includes a radio frequency device and a navigation baseband device. After the radio frequency device performed radio frequency front-end shaping and down-converting on the satellite signal received by the antenna, the satellite signal is converted to a digital intermediate frequency signal through an analog-to-digital conversion, then the digital intermediate frequency signal is sent to the navigation baseband processing device; the navigation baseband device performs baseband signal processing on the digital intermediate frequency signal, completes acquisition and tracking of the antenna signal, and sends the first information in the satellite signal to the processor. The first information includes the original navigation message information and the observation amount information, and is sent to the processor.

The processor 120 is configured to receive a security command and the first information and determine an information processing type for the received first information based on the security command; determine information to process in the first information when it is determined that the information processing type of the first information is the first processing type; send the information to process and the security command to a security algorithm device, and obtain second information returned after the security algorithm device processed the first information based on the security command; and transmit the second information; and transmit the first information directly when it is determined that the information processing type of the first information is a second processing type.

The security command includes whether security processing is required for the received information, and if security processing is required, it can be determined according to the security command as on how to process the received information, therefore, the processing type of the received information can be determined according to the security command. In the embodiment, the information that the processing type is the first processing type is information that requires security processing, and in an embodiment, the required security processing includes encryption processing and decryption processing. For example, in an embodiment, when it is determined that the first information requires encryption according to the security command, the first information is sent to the security algorithm device, the second information is obtained after the security algorithm device performed security processing on the first information, and the second information is transmitted. In another embodiment, if it is determined according to the security command that security processing of the information is not required, the information is directly transmitted. Further, the information that the processing type is the second processing type is information that does not require security processing. When the processor determines that the processing type of the first information is the second processing type, the processor directly transmits the first information.

The security command is a command inputted by the user to indicate whether the information requires security processing. Further, in an embodiment, the processor reads the value type in the security command and determines whether to encrypt or decrypt based on the value type. In an embodiment, the security command is in the format of an encryption/decryption command, and may be composed of a command header including a data starting byte CLA and an encryption/decryption type P1 or P2. In an embodiment, the specific meaning of CLA and P1, P2 are shown in Table 1.

TABLE 1

| Code | Value | meaning |
|------|-------|---------|
| CLA | 'CF' | Meaningless, beginning of the data |
| INS | 'xx' | 0xb0: SM4 Function<br>0xb1: AES Function<br>0xb2: DES Function |
| P1 | 'xx' | Types<br>0x00: ECB Encryption<br>0x40: ECB Decryption |
| P2 | 'xx' | '00': Encryption;<br>'11': Decryption |
| LEN | '00'-'FF' | Length of key (8, 16, 24, 32) |
| KEY | xx | The key with a length of LEN bytes loaded this time |
| Check | 'xx' | CHECKSUM |

As can be seen from Table 1, in an embodiment, the format of the security command is "P1 '00'" indicating that the information requires encryption.

In an embodiment, the processor determines the information to process in the first information, which includes:

Information in the first information conforming to a preset information type is determined as the information to process.

The preset information type is a preset type of information that requires processing, and is configured to determine which type of information requires security processing. For example, in an embodiment, the preset information type includes navigation information. The information to process is information that requires security processing. In the embodiment, after the information is determined to be the first processing type according to the security command, the information is recorded as the first information, and the processor looks up the first information for information conforming to the preset information type to determine the information as information to process. In an embodiment, the preset information type is navigation information, and the processor determines the navigation information in the first information as information to process.

Further, in one embodiment, the processor interprets the original navigation information, calculates the observation amount, interprets the user position speed clock difference, and interprets the received security command, and determines whether the original navigation information requires encryption or decryption; the information to process and the security command in the information requiring security processing are sent to the security device, the information returned by the security device is received, and the received information after being encrypted or decrypted by the security device is transmitted. If it is determined according to the security command that the information does not require encryption or decryption, it is transmitted directly by the processor. The transmitting of the first information or the second information by the processor may be transmitting to the user terminal.

In an embodiment, the security algorithm device receives the information to process and the security command sent by the processor, performs security processing on the information to process based on the security command, and returns the second information obtained after the security processing to the processor. The security command indicates what type of security processing is required for the information to process. In an embodiment, the security processing includes encryption processing and decryption processing, so in the embodiment, the security algorithm device determines an encryption processing for the information based on the security command, or determines a decryption processing for the information based on the security command.

The satellite signal receiving device includes the signal analyzing device and the processor. The signal analyzing device processes the received satellite signal and then obtains the first information, and sends the first information to the processor; the processor determines the information processing type of the first information according to the received security command, i.e., determines whether the received information requires security processing, determines the information to process from the first information when the first information requires security processing, sends the information to process and the security command to the security algorithm device, the processor obtains the second information after the security algorithm device performed security processing on the information to process, and the processor transmits the second information. According to the foregoing satellite signal receiving device, security sensor, and security chip, when it is determined that the first information requires security processing according to the received security command, the processor transmits the information after performing a security processing, thereby improving the security of the information.

In an embodiment, after receiving the processed information returned by the security algorithm device, the processor is further configured to encapsulate the received information after being encrypted or decrypted by the security device according to the communication protocol format described in Table 1. For example, in an embodiment, the encapsulation employs a communication protocol format of "CLA'BF'INS'xx'P1/P2'xx'LEN'xx'dataxxCheck'xx'". In an embodiment, the value follow the code have the meanings shown in Table 2.

TABLE 2

| Code | Value | Meaning |
| --- | --- | --- |
| CLA | 'BF' | Meaningless, beginning of data |
| INS | 'xx' | 0xb0: SM4 Function |
|  |  | 0xb1: AES Function |
|  |  | 0xb2: DES Function |
| P1 | 'xx' | Types |
|  |  | 0x00: ECB Encryption |
|  |  | 0x40: ECB Decryption |
| P2 | 'xx' | '00': Encryption; |
|  |  | '11': Decryption |
| LEN | '00'-'FF' | Length of data (should be multiples of 16) |
| data | xx | The key with a length of LEN bytes loaded this time |
| Check | 'xx' | CHECKSUM |

Figure 2:
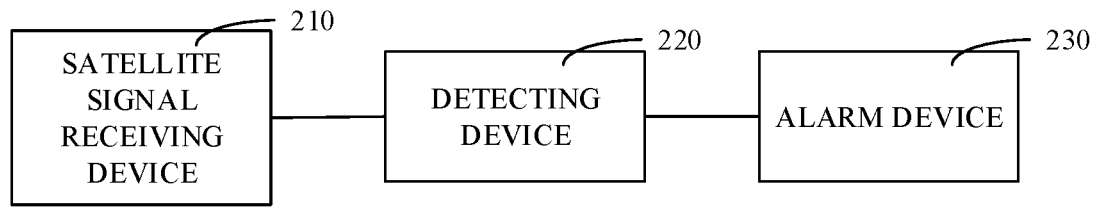
FIG. 2 is a block diagram of a security sensor according to an embodiment.

In an embodiment, the present disclosure further provides a security chip, as shown in FIG. 2, which is a block diagram of a security sensor according to the embodiment, which includes a satellite signal receiving device 210, a detecting device 220, and an alarm device 230 according to any of the foregoing embodiments.

The satellite signal receiving device 210 is configured to send the information to detect to the detecting device 220.

The information to detect is the information requiring detection, and may be satellite time information, time information of a device, current position information of the device, etc.

The detecting device 220 is configured to receive the information to detect, detects the information to detect according to the preset range, obtains the detection result, and sends the detection result to the alarm device 230.

The preset range can be set according to the actual situation, and the corresponding preset range is also different according to the information to detect; For example, when the information to detect is time information, the preset range is a preset time range.

The alarm device 230 is further configured to generate an operation state control signal according to the detection result, the operation state control signal is configured to control the operation state of the security chip in which the security sensor is located.

In an embodiment, when the detection result is Normal, the alarm device outputs a first operation state signal configured to control the security chip in which the security sensor being located to maintain normal operation or start operation. When the detection result is Abnormal, the alarm device outputs a second operation state signal configured to control the security chip to maintain a non-operating state or to pause the operation. In an embodiment, the second operation state control signal is an interrupt signal or a reset signal.

In an embodiment, the detecting device 220 includes a self-test device; in the embodiment, the information to detect includes first preset information and second preset information, the first preset information is within the preset range, and the second preset information is outside the preset range.

The self-test device is configured to obtain a first self-test result according to the first operation state of the alarm device when the first preset information is received; obtain a second self-test result according to the second operation state of the alarm device in the second preset information when receiving the second preset information; and determine a first detection result according to the first self-test result and the second self-test result; and the detection result includes a first detection result.

Further, the self-test device determines that the first detection result is that the security sensor is operating normally when both the first self-test result and the second self-test result are passed; and the self-test device determines that the first detection result is that the security sensor is operating abnormally when any one of the first self-test result and the second self-test result is Fail.

The alarm device 230 may determine that the first self-test result is Pass when the operation state control signal of the first operation state is the first operation state control signal. The second self-test result may be determined to be passed when the operation state control signal of the second operation state is the second operation state control signal.

In the embodiment, the preset information within the preset range is recorded as the first preset information, and the preset information outside the preset range is recorded as the second preset information; since the first preset information is within the preset range, the alarm device should not alarm when the detecting device received the first preset information, as such, when the corresponding signal the alarm device outputted in the case of the first preset information is the first operating status signal, the first self-test result is Pass; similarly, the determination of the second self-test result is similar to the determination of the first self-test result.

In another embodiment, the detecting device includes a real-time detecting device. In the embodiment, the information to detect includes real-time information determined by the satellite signal receiving device. When receiving the real-time information, the real-time detecting device detects the relationship between the real-time information and the preset range to obtain a second detection result; the detection result includes the second detection result.

Further, when the detecting device includes the real-time detecting device, the real-time detecting device determines that the second detection result is Normal when the real-time information is within the preset range; and the real-time detecting device determines that the second detection result is Abnormal when the real-time information is outside the preset range.

In an embodiment, the security sensor is a time sensor. In the embodiment, the real-time information includes real-time satellite time information determined by the satellite signal receiving device; when the second detection result is Normal, the time sensor further sends the real-time satellite time information to the device in which the time sensor being located and obtains a third detection result returned by the device; the third detection result is a detection result of detecting and determining a current time of a device in which the time sensor being located according to the real-time satellite time information, and the detection result includes the third detection result. Further, the alarm device generates a second operation state control signal when the second detection result or the third detection result is Abnormal.

In another embodiment, the security sensor includes a position sensor; the real-time information includes information of real-time position in which the position sensor determined by the satellite signal receiving device being located.

The security chip including the security sensor described can implement that whether the information is attacked can be determined by the operation state of the chip.

Figure 3:
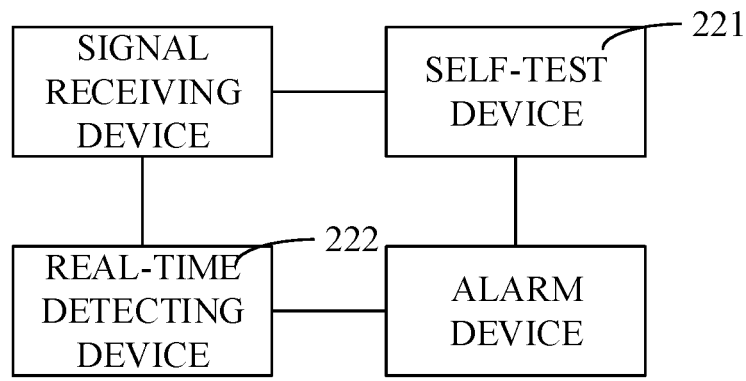
FIG. 3 is a block diagram of a security sensor according to another embodiment.

FIG. 3 is a block diagram of a security sensor according to another embodiment, the detecting device includes a self-test device 221 and a real-time detecting device 222.

In an embodiment, the security sensor is described in detail including a time sensor. In the embodiment, the information to detect is time information, the preset range is time range, the first preset information is first preset time information, and the second preset information is second preset time information.

The satellite signal receiving device sends time information to the detecting device; the detecting device receives the time information, detects the time information according to the preset time range, obtains the detection result, and sends the detection result to the alarm device which is configured to generate an operation state control signal according to the detection result, the operation state control signal is configured to control the operation state of the security chip in which the time sensor being located.

The preset time range may be preset according to the actual situation. In an embodiment, the preset time range is sometime after a certain time point, for example, after year 2012; in another embodiment, the preset time range is expressed as a certain time period, for example, the preset time range is from year 2012 to year 2020.

The satellite signal receiving device sends time information to the detecting device, the detecting device detects the time information, obtains the detection result, and sends the obtained detection result to the alarm device. The alarm device generates a corresponding operation state control signal according to the detection result, and the different operation state control information is configured to control the operation state of the security chip in which the time sensor being located.

In an embodiment, the detecting device includes a self-test device and a real-time detecting device, the self-test device is configured to self-test the time sensor to detect whether the sensor is subjected to a time attack. The real-time detecting device may be configured to detect whether the satellite real-time time information determined by the satellite signal receiving device is normal or detect the time of the device connected to the security chip in which the sensor being located, and detect whether the time information of the device is attacked. Further, the real-time detecting device detecting the time of the device connected to the security chip in which the sensor being located may be that the security chip obtains the current time information of the device, compares the current time information of the device with the real-time satellite time, and obtains the determination result; or sends the real-time satellite time to the system bus of the device when it is detected that the real-time satellite time is normal, and the device determines whether the times are consistent, and returns the determination result.

In an embodiment, the time information sent by the satellite signal receiving device is two preset time points, and is configured to self-test the time sensor, including the first preset time information and the second preset time information. One of the first preset time information and the second preset time is within the preset time range and the other is outside the preset time range, in the embodiment, the time point within the preset time range is recorded as the first preset time information, and the time point outside the preset time range is recorded as the second preset time information.

Figure 4:
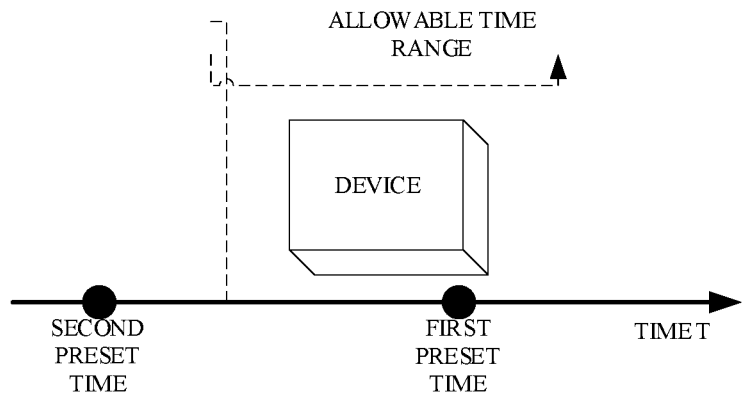
FIG. 4 is a schematic diagram of relationship between a preset time range and an device time, a first preset time, and a second preset time according to an embodiment.

FIG. 4 is a schematic diagram illustrating the relationship between the preset time range and the device time, the first preset time, and the second preset time according to an embodiment.

In the embodiment, the self-test process is a process indicating whether the alarm device can work normally when the self-test device determines the first preset time and the second preset time, that is, the detecting of whether the time sensor can work normally.

In an embodiment, the self-test process of the time sensor is described using the detecting device as the self-test device. The self-test device obtains a first self-test result according to the first operation state of the alarm device when the first preset time information is received; the self-test device obtains a second self-test result according to the second operation state of the alarm device when the second preset time information is received; the self-test device determines a first detection result according to the first self-test result and the second self-test result; and the detection result includes a first detection result.

When the self-test device receives the first preset time information, the operation state of the corresponding alarm device is recorded as the first operation state; since the first preset time information is within the preset time range, the alarm device should be in an non-alarming operating state at this time. Thereby determining whether the first operation state is the non-alarming operation state, if yes, a first self-test result of "Pass" is obtained, and if no, a first self-test result of "Fail" is obtained. Similarly, the second self-test result may be determined in the same manner and is omitted for brevity.

Further, the first detection result is obtained according to the first self-test result and the second self-test result. In an embodiment, when both the first self-test result and the second self-test result are Pass, the self-test device determines that the first detection result is that the time sensor is operating normally; when any one of the first self-test result and the second self-test result is Fail, it is determined that the first detection result is that the time sensor is operating abnormally. It can be understood that the first detection result reflects whether or not the time sensor can operate normally.

In an embodiment, the operation state control signal correspondingly outputted by the alarm device in a non-alarming state is recorded as the first operation state control signal, and the operation state control signal correspondingly outputted by the alarm device in an alarming state is recorded as the second operation state control signal. In the embodiment, when the operation state control signal outputted by the alarm device corresponding to the first operation state is the first operation state control signal, the first self-test result is Pass; when the operation state control signal corresponding to the second operation state of the alarm device is the second operation state control signal, the second self-test result is Pass.

Further, in an embodiment, the operation state control signal outputted by the alarm device is a first operation state control signal, which indicates that the security chip in which the control time sensor located is controlled to normally operate; when the operation state control signal outputted by the alarm device is the second operation state control signal, it indicates that the security chip in which the time sensor located is controlled to pause operation.

Further, in an embodiment, the first operation state control signal is a release reset signal configured to control the time sensor to end the reset state, that is, the alarm device is not alarming; the second operation state control signal is a reset signal or an interrupt signal configured to control the time sensor to enter a reset state or an interrupt state, and configured to control the time sensor to temporarily pause operating, that is, the alarm device is alarming.

In an embodiment, the self-test process of the self-test device is completed, and the first detection result is obtained. The first detection result indicates a final result of a self-test; the first detection result is Abnormal, that is, the time sensor failed the self-test, and the alarm device outputs a second operation state control signal to control the security chip in which the time sensor being located to be in a non-operation state. If the obtained first detection result is Normal, that is, the time sensor passed the self-test, the alarm device outputs a first operation state control signal. In an embodiment, the first operation state control signal is a release reset signal, that is, the security chip in which the time sensor located is controlled to start operating, or the time sensor passed the self-test, and the first operation state control signal is that the alarm device controls the security chip in which the time sensor located is controlled to be operating.

In an embodiment, the self-test includes a power-on self-test and a real-time self-test in the operating process. As an example, for the power-on self-test, when the first detection result obtained by the power-on self-test is Normal, the alarm device outputs a first operation state control signal to control the security chip in which the time sensor being located to start operating; when the obtained first detection result is Abnormal, the alarm device outputs a second operation state control signal to control the security chip in which the time sensor being located to maintain the non-operating state. In another embodiment, as an example, for the real-time self-test in the operating process, when the first detection result obtained by the real-time self-test is Normal, the alarm device outputs a first operation state control signal, the chip in which the time sensor located is controlled to remain in the operating state. When the first detection result obtained in the real-time self-test in the operating process is Abnormal, the alarm device outputs a second operation state control signal to control the chip in which the time sensor being located to pause operation.

In an embodiment, the detecting device includes a real-time detecting device, and the information to detect includes real-time satellite time information determined by the satellite signal receiving device; the real-time detecting device detects a time relationship between the real-time satellite time information and a preset time range to obtain a second detection result; in the embodiment, the detection result includes the second detection result.

In the embodiment, the time information includes real-time satellite time information determined by the satellite signal receiving device. The real-time time information is time information obtained by the satellite signal receiving device receiving the satellite signal and analyzing the satellite signal. In an embodiment, the time sensor may obtain the time information through a navigation system satellite such as GPS, Beidou, GLONASS, Galileo, etc.

When the time information received by the real-time detecting device is the real-time satellite time information, the time sensor performs real-time detection on the real-time satellite time information determined by the satellite signal receiving device in the operating process to determine whether the currently obtained real-time satellite time information is normal. Therefore, the second detection result is a detection result that the real-time detecting device determines whether the real-time satellite time is normal.

In an embodiment, the real-time detecting device determines that the second detection result is Normal when the real-time time information is within a preset time range; the real-time detecting device determines that the second detection result is Abnormal when the real-time time information is outside the preset time range.

In the embodiment, if the real-time satellite time information is detected to be outside the preset time range, the real-time satellite time information is determined to be inaccurate, and the second detection result determined by the real-time detecting device is Abnormal, and the security chip in which the time sensor located paused. Similarly, if the real-time satellite time information is detected to be within the preset time range, the real-time satellite time information is determined to be normal, and the second detection result determined by the real-time detecting device is Normal, and the security chip in which the time sensor located maintained in a normal operating state.

In an embodiment, the satellite signal receiving device simultaneously receives satellite signals of two satellite systems and determines the accuracy of the real-time satellite time information by inter-authentication between the satellite signals of the two satellite systems. In an embodiment, both the Beidou navigation satellite system of China and the GPS system of the Deviceed States can be received simultaneously to ensure the safety and accuracy of the time. When the real-time satellite time signals of the two sets of received satellite signals are inconsistent, the alarm device generates an alarm signal.

Further, when the second detection result is Normal, the time sensor further sends the real-time satellite time information to the device connected to the security chip where the time sensor being located. A third detection result returned by the device is obtained; the third detection result is a detection result determined by detecting the current time of the device in which the time sensor being located according to the real-time satellite time information, and the detection result includes the third detection result.

The process of detecting the current time of the device in which the time sensor being located according to the real-time satellite time information is recorded as the real-time detection process of the device time, and whether the device is attacked at the current time can be determined through the real-time detection process of the device time. The specific detection step may be that the real-time satellite information is sent to the device in which the time sensor being located, the device determines whether the current time of the device is consistent with the real-time satellite time, and the third detection result is returned. When the current time of the device is consistent with the real-time satellite time, the returned third detection result is Normal; when the current time of the device is inconsistent with the real-time satellite time, the returned third detection result is Abnormal.

In an embodiment, the step of sending the real-time satellite time information to the device in which the time sensor being located includes the real-time detecting device sends the real-time satellite time information to the security algorithm device of the security chip in which the time sensor being located when the second detection result is Normal, and sends a valid identifier to the security algorithm device. When receiving the valid identifier, the security algorithm device encrypts the real-time satellite time information through a symmetric algorithm, and performs a digest operation on the real-time satellite time information through a hash algorithm. The encrypted time information, the digest information, and the valid identifier are broadcasted to the device connected to the security chip where the time sensor being located through the system bus. The device obtains the time plaintext information through decryption, performs digest operation using the same algorithm used in encryption, and determines whether the device time is accurate according to the time plaintext information and the digest information, that is, determines whether the device time is tampered.

In an embodiment, the symmetric algorithm configured to encrypt the time information may be the DES algorithm, and the hash algorithm used in the digest operation may be the SHA-1 algorithm. In other embodiments, other algorithms may also be employed for implementation.

In another embodiment, the step of real-time detecting the current time of the device in which the time sensor being located may further be that, when the second detection result is Normal, the satellite signal receiving device obtains the current time information of the device, sends the current time information of the device to the real-time detecting device, the real-time detecting device determines whether the current time of the device is consistent with the real-time satellite time, and obtains a third detection result. If the current time of the current device is consistent with the real-time satellite time, the third detection result is Normal; and when the current time of the device is inconsistent with the real-time satellite time, the third detection result is Abnormal.

In an embodiment, after the real-time detecting device obtained the second detection result or the third detection result, the real-time detecting device sends the second detection result or the third detection result to the alarm device, and the alarm device generates a corresponding operation state control signal according to the second or third detection result. In an embodiment, the alarm device generates the second operation state control signal when the second detection result or the third detection result is Abnormal. That is, when the real-time detecting device detected that the real-time satellite signal is abnormal or that the current time of the device is inconsistent with the normal real-time satellite signal, the second operation state control signal is generated, that is, the security chip in which the time sensor is controlled to pause operation. In another embodiment, when the second detection result is Normal, the alarm device outputs the first operation state control signal to control the time sensor to maintain the normal operating state. Similarly, when the third detection result is Normal, the alarm device also outputs the first operation state control signal to control the time sensor to maintain the normal operating state.

The security chip with the time sensor ca determine whether the time is attacked through the operation state of the security chip in which the time sensor being located, address the security requirement of the network system and the device for time information, and protect the unified time of the system and the device; thereby rendering the security chip with security features such as non-bypassing and anti-attack real-time detection, which can effectively protect the system and device in real time.

In an embodiment, a security sensor including a position sensor is described in detail as an example. In the embodiment, the position sensor includes a satellite signal receiving device, a detecting device, and an alarm device. The information to detect is position information, the preset range is a position range, the first preset information is first preset position information, and the second preset information is second preset position information.

The satellite signal receiving device transmits position information to the detecting device; the detecting device receives the position information, detects the position information according to the preset position range, obtains the detection result, and sends the detection result to the alarm device which outputs an operation state control signal according to the detection result. The operation state control signal is configured to control the operation state of the security chip in which the position sensor being located.

The preset position range may be preset according to the actual situation, and in an embodiment, the position range may be a latitude and longitude range.

In an embodiment, the detecting device includes a self-test device and a real-time detecting device, the self-test device is configured to self-test the sensor and detect whether the position sensor is attacked; the real-time detecting device is configured to detect the position of the device connected with the security chip in which the sensor being located, and detect whether the position information of the device is attacked.

The satellite signal receiving device sends the position information to the detecting device which detects the position information, obtains the detection result, and sends the obtained detection result to the alarm device. The alarm device generates a corresponding operation state control signal according to the detection result, and the different operation state control information is configured to control the operation state of the security chip in which the position sensor being located.

In an embodiment, the position information sent by the satellite signal receiving device is two preset position points for self-testing the position sensor, including the first preset position information and the second preset position information. The first preset position information is within the preset position range, and the second preset position information is outside the preset position range. In a practical case, it is satisfactory as long as one of the two position points is within the preset position range and the other is not within the preset position range. In the embodiment, the position point in the preset position range is recorded as the first preset position information, and the position point outside the preset position range is recorded as the second preset position information. In the embodiment, the self-test process detects whether the position sensor can operate normally.

Figure 5:
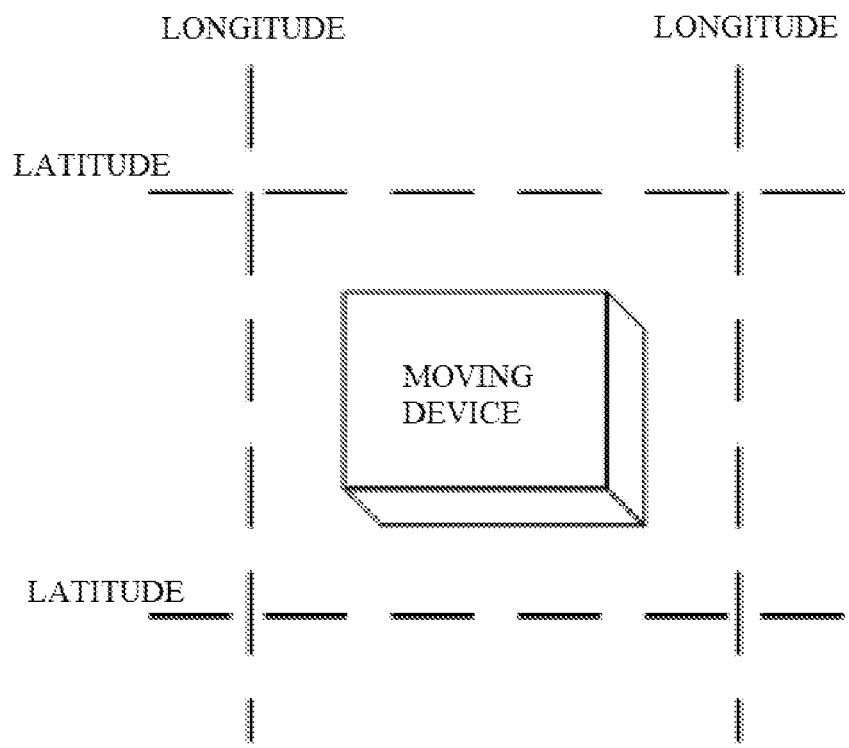
FIG. 5 is a schematic diagram of relationship between a preset position range and an device position according to an embodiment.

FIG. 5 is a schematic diagram of relationship between a preset position range and an device position according to an embodiment. First, the latitude and longitude range in which the mobile device can move (as shown in the dashed box) are set. The security chip including the position sensor monitors the mobile device in real time. When detecting that the information of real-time position of the device exceeded the set range, an alarm mechanism is started, and the alarm device generates a corresponding alarm signal, for example, to prohibit or restrict the equipment from operation, and to send alarm signal to the background management system, etc.

In an embodiment, the self-test process of the time sensor is described using the detecting device as the self-test device. The self-test device obtains a first self-test result according to the first operation state of the alarm device when the first preset position information is received; the self-test device obtains a second self-test result according to the second operation state of the alarm device when the second preset position information is received; the self-test device determines a first detection result according to the first self-test result and the second self-test result; the detection result includes a first detection result.

When the self-test device receives the first preset position information, the alarm device is in an operating state, in the embodiment, the operating state is recorded as the first operation state when the alarm device is in the first preset position information; since the first preset position information is within the preset position range, the alarm device should be in the non-alarming operation state at this time. Whether the first operation state is a non-alarm operation state is determined, if yes, a first self-test result of "Pass" is obtained, and if no, a first self-test result of "Fail" is obtained. Similarly, the second self-test result may be determined in the same manner and is omitted for brevity.

Further, the first detection result is obtained according to the first self-test result and the second self-test result. In an embodiment, when both the first self-test result and the second self-test result are Pass, the self-test device determines that the first detection result is that the position sensor is operating normally; when any one of the first self-test result and the second self-test result is Fail, it is determined that the first detection result is the position sensor is operating abnormally. It can be understood that the first detection result reflects whether or not the position sensor can operate normally.

Further, the operation state control signal correspondingly outputted by the alarm device in the non-alarming state is recorded as the first operation state control signal, and the operation state control signal correspondingly outputted by the alarm device in the alarming state is recorded as the second operation state control signal. In the embodiment, when the operation state control signal of the alarm device is the first operation state control signal, the first self-test result is Pass; and when the operation state control signal of the alarm device is the second operation state control signal, the second self-test result is Pass.

Further, in an embodiment, when the operation state control signal outputted by the alarm device is a first operation state control signal, which indicates that the security chip in which the time sensor being located is normally operating; when the operation state control signal outputted by the alarm device is the second operation state control signal, it indicates that the security chip in which the time sensor being located is controlled to pause operation.

Further, in an embodiment, the first operation state control signal is a release reset signal configured to control the position sensor to end the reset state, that is, the alarm device is not alarming; the second operation state control signal is a reset signal or an interrupt signal configured to control the position sensor to enter a reset state or an interrupt state, and configured to control the position sensor to temporarily pause operation, that is, the alarm device is alarming. In an embodiment, the alarm device outputs the second operation state control signal when the first detection result is Abnormal.

In an embodiment, the self-test process of the self-test device is ended, a first detection result is obtained, and the first detection result is sent to the alarm device. The first detection result indicates a final result of a self-test; the first detection result is Abnormal, that is, the position sensor failed the self-test, the alarm device outputs a second operation state control signal, and the security sensor in which the position sensor located is controlled to be in a non-operating state. If the obtained first detection result is Normal, that is, the position sensor passed the self-test, the alarm device outputs a first operation state control signal. In an embodiment, the first operation state control signal is a release reset signal, that is, the security chip in which the position sensor located is controlled to start operating, or the position sensor passed the self-test, and the first operation state control signal is that the alarm device controls the security chip in which the position sensor located to be in the operating state.

In an embodiment, the self-test includes a power-on self-test and a real-time self-test in the operating process. As an example, for the power-on self-test, when the first detection result obtained by the power-on self-test is Normal, the alarm device outputs a first operation state control signal to control the security chip in which the time sensor being located to start operating; when the obtained first detection result is Abnormal, the alarm device outputs a second operation state control signal to control the security chip in which the time sensor being located to maintain the non-operating state. In another embodiment, as an example, for the real-time self-test in the operating process, when the first detection result obtained by the real-time self-test is Normal, the alarm device outputs a first operation state control signal, the chip in which the time sensor being located is controlled to remain in the operating state. When the first detection result obtained in the real-time self-test in the operating process is Abnormal, the alarm device outputs a second operation state control signal to control the chip in which the time sensor being located to pause operation.

In an embodiment, the detecting device includes a real-time detecting device, and the information to detect includes real-time satellite time information determined by the satellite signal receiving device; the real-time detecting device detects a time relationship between the real-time satellite time information and a preset time range to obtain a second detection result; in the embodiment, the detection result includes the second detection result. The information of real-time position in which the position sensor being located is the information of the real-time position of the device connected to the security chip in which the position sensor being located. That is, the real-time detecting device detects the real-time position of the device, and determines whether the position of the device conforms to the range preset for the position of the device. The preset range of the device position is a preset position range.

The information of real-time position is the position information that is interpreted from the satellite signals received by the satellite signal receiving device. In an embodiment, the position sensor may obtain the position information through a navigation system satellite such as GPS, Beidou, GLONASS, Galileo, etc.

When receiving the information of real-time position transmitted from the satellite signal receiving device, the real-time detecting device detects a positional relationship between the information of real-time position and the preset position range, and obtains a second detection result. The detection result includes a second detection result.

In the embodiment, when the position information received by the real-time detecting device is information of real-time position, it is a process the position sensor detecting the position information of the device connected to the chip in which the sensor being located in the operating process. The second detection result is a detection result obtained by the real-time detecting device determining whether the real-time position is attacked.

In an embodiment, the real-time detecting device determines that the second detection result is Normal when the information of real-time position is within the preset position range; the real-time detecting device determines that the second detection result is Abnormal when the information of real-time position is outside the preset position range.

In the embodiment, if the information of real-time position is detected to be outside the preset position range, the information of real-time position is determined to be non-conforming to the allowable movement range preset for the position of the device, the second detection result determined by the real-time detecting device is Abnormal, that is, the alarm device generates alarm information, the security chip in which the position sensor located is controlled to stop operation, and the alarm information may be an interrupt signal or a reset signal. Similarly, if the information of real-time position is detected to be within the preset position range, the information of real-time position is determined conforming to the preset allowable movement range for the position of the device, and the second detection result determined by the real-time detecting device is Normal, so the alarm device will not generate an alarm signal, the security chip in which the position sensor located remain in a normal operating state.

In the foregoing security chip, the position sensor includes a satellite signal receiving device, an alarm device, and a detecting device, the detecting device obtains position information through the satellite signal receiving device, detects the position information according to a preset position range, obtains a detection result, and sends the detection result to the alarm device which generates an operation state control signal according to the detection result, and further controls the operation state of the security chip in which the position sensor being located. Thus, through the operation state of the security chip in which the position sensor being located, it can be determined as on whether the position information is attacked. Therefore, the security chip containing the position sensor can correctly obtain the position information of the device, and is unforgeable; also, since the position sensor has the functions of power-on self-test and real-time detection, the security chip contain the position sensor has the characteristics of non-bypassing and unforgeable.

Figure 6:
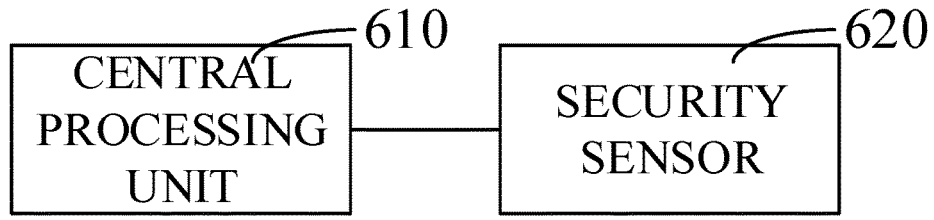
FIG. 6 is a block diagram of a security chip according to an embodiment.

In an embodiment, the present disclosure further provides a security chip, as shown in FIG. 6, including a central processing device 610 and a security sensor 620 according to any of the foregoing embodiments.

When the alarm device of the security sensor 620 outputs the first operation state control signal, the central processing device is controlled to be in an operating state; and when the alarm device of the security sensor 620 outputs the second operation state control signal, the central processing device is controlled to be in a non-operating state.

The specific definition of the security sensor in the security chip can be recorded as the foregoing definition of the security sensor and is omitted for brevity.

Figure 7:
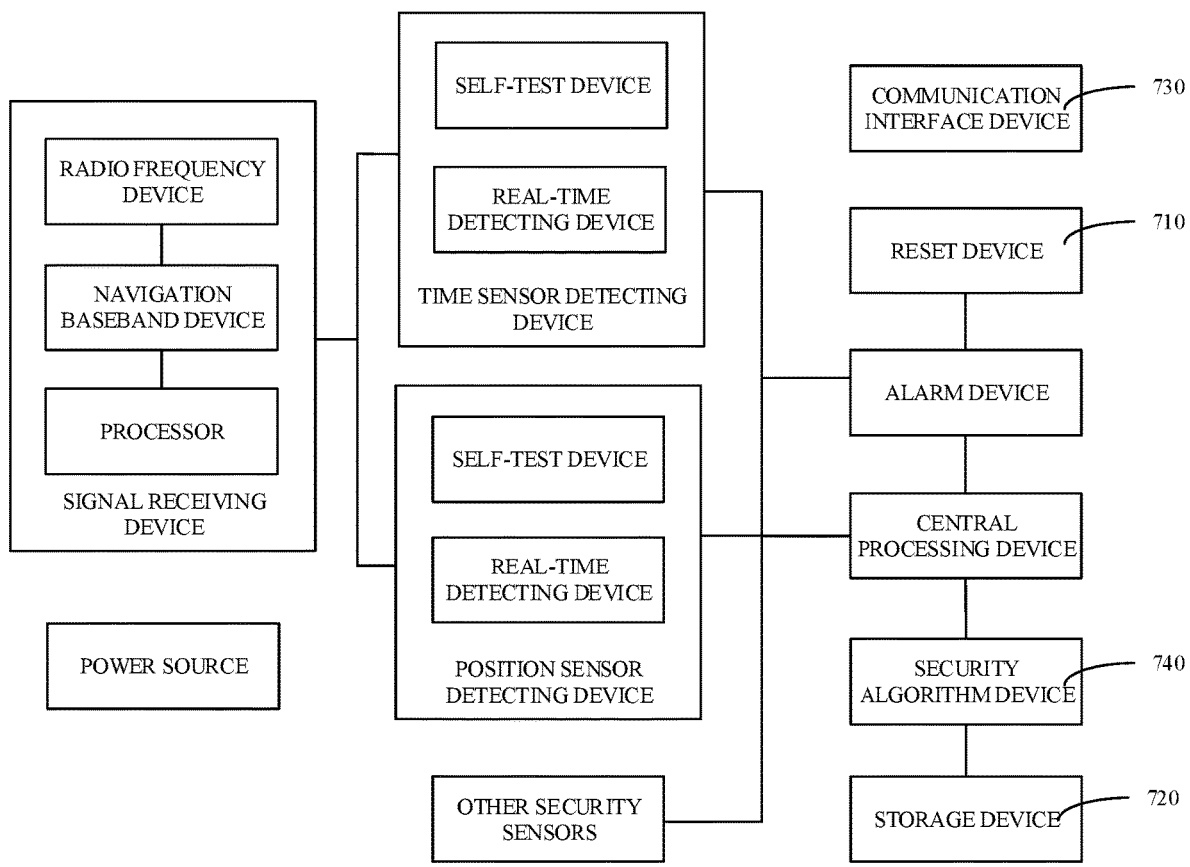
FIG. 7 is a block diagram of a security chip according to another embodiment.

In an embodiment, as shown in FIG. 7, the security chip further includes a reset device 710, a storage device 720 configured to store data, a communication interface device 730 configured to connect devices, and a security algorithm device 740 configured to perform security processing. In the embodiment, when the reset device receives the reset signal generated by the alarm device, the central processing device is controlled to be in a reset state.

In an embodiment, the security algorithm device includes a security setting sub-device and a security processing sub-device.

The security setting sub-device is configured to set a security processing mode; the security processing sub-device is configured to read the security processing mode in the security setting sub-device, and perform security processing on the information to process based on the security command and the security processing mode.

In an embodiment, the security processing mode may be set through a serial port, and further, a format of setting the security processing mode is shown in Table 2. For example, in an embodiment, "INS'0xb0'" is a SM4 function, which indicates that the SM4 algorithm is required to encrypt or decrypt the information to process. In an embodiment, the security processing mode may be preset.

The security processing mode determines the algorithm to employ for the security processing of the information to process, and the security command determines the process to encrypt or decrypt the information to process; the security processing sub-device performs security processing on the information to process according to the security command and the security processing mode. For example, if the information to process is to be encrypted according to the security command, and the information to process is determined to be processed using the SM4 algorithm for security processing according to the security processing mode, then the security processing sub-device uses the SM4 algorithm to encrypt the information to process.

Further, the storage device stores a key required for security processing; the security processing sub-device reads the key in the storage device, and performs security processing on the information to process based on the security command, the security processing mode, and the key.

In an embodiment, the key may be set via the serial port according to the format described in Table 2; in an embodiment, for example, the key is "CLA'CF'LEN'01'KEY'1'Check'2'". In the embodiment, according to various algorithms, the encryption process or the decryption process of the information to process through the key may be implemented in any manner and is omitted for brevity in the disclosure.

Figure 8:
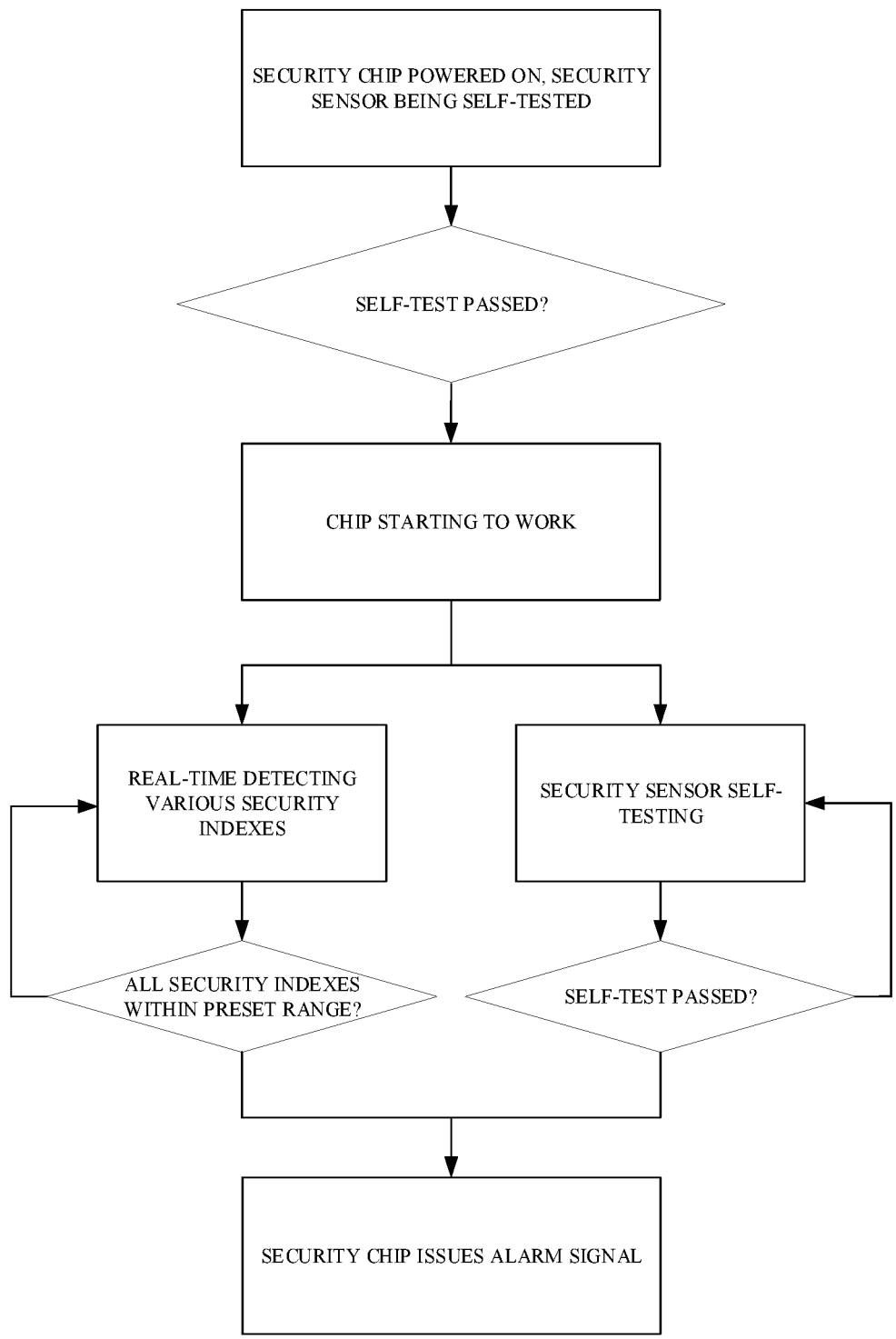
FIG. 8 is a flowchart of an application method of a security chip according to an embodiment.

In an embodiment, the operating flowchart of the security chip is shown in FIG. 8, which includes steps 1 to 8.

In step 1: the security chip powered-on first conducts a self-test of the security sensor.

The self-test is to detect whether the security sensor can operate normally, further, two preset values can be set for one safety index during the self-test, one preset value is within the preset range, one preset value is outside the preset range. Then, it is detected whether the corresponding security sensor is in a normal operation state when receiving the two safety index values, if yes, it is determined that the self-test passed, and if no, it is determined that the self-test failed. In the self-test processing, the security chip is in a non-operating state, and only when the self-test is performed, would the security chip start to work. For example, in an embodiment, as an example, the self-test of the position sensor includes step 1 to step 4.

In step 1): the navigation satellite receiving device sends the preset first fixed latitude-longitude information to the self-test device, the first fixed latitude-longitude information is within the preset range. When the self-test device receives the first fixed latitude-longitude information, if the alarm device is not alarming, the first self-test is passed;

In step 2): the navigation satellite receiving device sends the preset second fixed latitude-longitude information to the self-test device, the second fixed latitude-longitude information is not within the preset range. If that alarm device is alarming when the second fixed latitude-longitude information is received by the self-test device, the second step of self-test passes;

In step 3): the self-test device consolidates and determines the self-test results of the first step and the second step, and sends the final self-test result to the alarm device. If both the first step and the second step self-test pass, the self-test is determined to pass, otherwise the self-test fail;

In step 4): if the self-test is passed, the alarm device releases the reset signal; if the self-test failed, the position sensor is determined to be attacked, the reset signal is valid, and the chip is always in the reset state.

The security sensor may include a time sensor, a position sensor, a frequency sensor, a temperature sensor, etc. The self-test process of each security sensor may be performed in parallel or may be performed in series.

In step 2: if the self-test passes, the processor is started, otherwise, the security chip is in a reset state.

In step 3: the security chip operates normally, that is, after the processor is started, the security sensor detects safety indexes in real time.

In step 4: whether all the safety indexes are within the preset range is determined, and if yes, the chip is controlled to remain in the normal operating state, and return to step 3; if not, jump to step 7.

In step 5: in the normal operating process of the security chip, the processor may send a self-test instruction from time to time to carry out self-test on the security sensor to confirm whether the security sensor is being attacked; the self-test procedure is the same as the power-on self-test procedure in step 1.

In step 6: whether the self-test of each security sensor is passed in the operating process is determined, if yes, the security chip is controlled to remain in the normal operating state, and return to step 6; if not, jump to step 7.

In step 7: the security chip issues an alarm signal.

The user can set the alarm signal as an interrupt signal or a reset signal according to the actual situation, and control the alarm interrupt processing or forces the chip to be in a reset state to avoid information leakage.

In an embodiment, the present application further provides an application method of a security chip, which includes the following steps:

The security chip receives the first information and the security command, and determines a processing type of the information based on the security command; when the processing type of the information is the first processing type, obtains the second information after performing security processing on the information, and transmits the second information; and when the processing type of the information is the second processing type, the first information is directly transmitted.

After receiving the information and the security command, the security chip interprets the security command and determines a processing type of the received first information according to the security command, the processing type includes that an encryption processing, or a decryption processing is required, or no security processing is required. In the embodiment, the information requiring the encryption processing or the decryption processing is the information requiring the security processing, and is recorded as the first processing type. Therefore, when the processing type of the information is determined to be the first processing type according to the security command interpretation, the first message is security-processed and then transmitted. In another embodiment, when it is determined that the processing type of the first information is the second processing type, the first information is directly transmitted without processing.

In an embodiment, when the processing type of the first information is determined to be the first processing type, the security chip determines the portion of the first information conforming to the preset information type as the information to process, obtains the preset security processing mode, and the key, and determines whether the security processing mode, the key, and the security command are encrypted or decrypted. The information to process is encrypted or decrypted to obtain the processed information. Further, the security chip encapsulates the second information obtained after the processing and sends the second information.

In an embodiment, the security chip may further determine whether the security chip is attacked according to the detection result of the information to detect by the security sensor, and may further control the security chip to pause operation when the security chip is detected to be attacked. Further, the security sensor of the security chip detects the information to detect corresponding thereto to obtain a detection result, and when the detection result is Normal, the alarm device of the security chip outputs an operation state signal to control the security chip to be in an operating state; and when the detection result is Abnormal, the alarm device of the security chip outputs an operation state signal to control the security chip to be in a non-operating state.

The invention claimed is:
1. A satellite signal receiving device, comprising:
a signal analyzing device and a processor;
the signal analyzing device is configured to:
process a received satellite signal to obtain first information, and send the first information to the processor, wherein the first information comprises candidate information to be processed;
wherein the processor is configured to:
receive a security command and the first information and determine an security processing type for the received first information based on the security command;
determine candidate information in the first information when it is determined that the security processing type of the first information is a first processing type;
send the first information and the security command to a security algorithm device, and obtain second information returned after the security algorithm device processes the first information based on the security command; and
send out the second information; and
send out the first information directly when it is determined that the security processing type of the first information is a second processing type,
wherein the satellite signal receiving device is further configured to determine the candidate information in the first information being a preset information type.

2. A security sensor, comprising a detecting device, an alarm device, and a satellite signal receiving device,
wherein the satellite signal receiving device comprises:
a signal analyzing device and a processor;
the signal analyzing device is configured to process a received satellite signal to obtain first information, and send the first information to the processor, wherein the first information comprises candidate information to be processed;
wherein the processor is configured to:
receive a security command and the first information and determine an security processing type for the received first information based on the security command;

determine the candidate information in the first information when it is determined that the security processing type of the first information is a first processing type;

send the first information and the security command to a security algorithm device, and obtain second information returned after the security algorithm device processes the first information based on the security command; and send out the second information; and send out the first information directly when it is determined that the security processing type of the first information is a second processing type, wherein the processor is configured to send test information to the detecting device;

the detecting device is configured to receive the test information, detect the test information according to a preset range, obtain a detection result, and send the detection result to the alarm device, wherein the test information comprises first preset information and second preset information, the first preset information is within the preset range, and the second preset information is outside the preset range; and the alarm device is configured to generate an operation state control signal according to the detection result, wherein the detecting device comprises a self-test device, configured to:

obtain a first self-test result according to a first operation state of the alarm device when the first preset information is received;

obtain a second self-test result according to a second operation state of the alarm device when the second preset information is received; and determine a first detection result according to the first self-test result and the second self-test result, wherein the detection result comprises the first detection result.

3. The security sensor according to claim 2, wherein the first detection result is that the security sensor is operating normally when both the first self-test result and the second self-test result are passed; and the first detection result is that the security sensor is operating abnormally when either one of the first self-test result and the second self-test result is failed; and the first self-test result is passed when the operation state control signal of the first operation state is a first operation state control signal; and the second self-test result is passed when the operation state control signal of the second operation state is a second operation state control signal.

4. The security sensor according to claim 3, wherein the alarm device is further configured to output the second operation state control signal when the first detection result is abnormal.

5. The security sensor according to claim 4, wherein the second operation state control signal is an interrupt signal or a reset signal.

6. The security sensor according to claim 2, wherein the detecting device comprises a real-time detecting device, and the test information comprises real-time information determined by the satellite signal receiving device, wherein the real-time detecting device is configured to detect a relationship between the real-time information and the preset range and to obtain a second detection result when the real-time detecting device receives the real-time information; and the detection result comprises the second detection result.

7. The security sensor according to claim 6, wherein the real-time detecting device is further configured to determine that the second detection result is normal when the real-time information is within the preset range; and determine that the second detection result is abnormal when the real-time information is outside the preset range.

8. The security sensor according to claim 7, further comprising a time sensor;

a time sensor, configured to send real-time satellite time information when the second detection result is normal;

wherein the real-time satellite time information is determined by the satellite signal receiving device and comprised in the real-time information;

wherein the real-time detecting device is further configured to obtain a third detection result returned by the device; the third detection result is a detection result of detecting a current time of the device in which the time sensor being located according to the real-time satellite time information, and the detection result comprises the third detection result.

9. The security sensor according to claim 8, wherein the alarm device is further configured to generate a second operation state control signal when the second detection result or the third detection result is abnormal.

10. The security sensor according to claim 7, further comprising a position sensor, wherein the real-time information comprises information of a real-time position of the position sensor determined by the satellite signal receiving device.

11. A security chip, comprising a central processing device, and a security sensor, comprising a detecting device, an alarm device, and a satellite signal receiving device, wherein the satellite signal receiving device comprises:

a signal analyzing device and a processor;

the signal analyzing device is configured to:

process a received satellite signal to obtain first information, and send the first information to the processor, wherein the first information comprises candidate information to be processed;

wherein the processor is configured to:

receive a security command and the first information and determine an security processing type for the received first information based on the security command;

determine candidate information in the first information when it is determined that the security processing type of the first information is the first processing type;

send the first information and the security command to a security algorithm device, and obtain second information returned after the security algorithm device processes the first information based on the security command; and send out the second information; and send out the first information directly when it is determined that the information processing type of the first information is a second processing type, wherein the processor is configured to send test information to the detecting device;

the detecting device is configured to receive the test information, detect the test information according to a preset range, obtain a detection result, and send the detection result to the alarm device, wherein the test information comprises first preset information and second preset information, the first preset information is within the preset range, and the second preset information is outside the preset range; and the alarm device is configured to generate an operation state control signal according to the detection result, wherein the operation state control signal is configured to control an operation state of a security chip in which the security sensor is located, wherein the detecting device comprises a self-test device, configured to:

obtain a first self-test result according to a first operation state of the alarm device when the first preset information is received;

obtain a second self-test result according to a second operation state of the alarm device when the second preset information is received; and determine a first detection result according to the first self-test result and the second self-test result, wherein the detection result comprises the first detection result, wherein the first detection result is that the security sensor is operating normally when both the first self-test result and the second self-test result are passed; and the first detection result is that the security sensor is operating abnormally when either one of the first self-test result and the second self-test result is failed; and the first self-test result is passed when the operation state control signal of the first operation state is a first operation state control signal; and the second self-test result is passed when the operation state control signal of the second operation state is a second operation state control signal, wherein the central processing device is controlled to be in an operating state when the first operation state control signal is outputted by an alarm device of the security sensor; and the central processing device is controlled to be in a non-operating state when the second operation state control signal is outputted by the alarm device of the security sensor.

12. The security chip according to claim 11, further comprising
  a reset device;
  a storage device configured to store data, wherein the storage device is coupled to the reset device;
  a communication interface device configured to connect devices; and
  a security algorithm device configured to perform security operations, wherein the security algorithm device is coupled to the storage device;
  wherein the central processing device is controlled to be in a reset state when the reset device receives a reset signal generated by the alarm device.

13. The security chip according to claim 12, wherein the security algorithm device comprises:
  a security setting sub-device, configured to set a security processing mode; and
  a security processing sub-device, configured to read the security processing mode in the security setting sub-device, and perform security processing on the received information to process based on the received security command and the security processing mode.

14. The security chip according to claim 13, wherein:
  the storage device is further configured to store a key required for security processing; and
  the security processing sub-device is further configured to read the key in the storage device, and perform security processing on the information to process based on the security command, the security processing mode, and the key.

\* \* \* \* \*